United States Patent [19]

Ramos

[11] 4,144,422
[45] Mar. 13, 1979

[54] TILT ACTUATED CIRCUIT BREAKER

[76] Inventor: Orfelio Ramos, 813 NW. 27 Ct., Miami, Fla. 33125

[21] Appl. No.: 815,677

[22] Filed: Jul. 14, 1977

[51] Int. Cl.$^2$ ............................................. H01H 35/14
[52] U.S. Cl. ................................. 200/61.52; 200/318
[58] Field of Search ............ 200/52 A, 61.45 R, 61.48, 200/61.5, 61.52, 318, 279, 238, 248–251, 252, 258–261

[56] References Cited

U.S. PATENT DOCUMENTS

| | | | |
|---|---|---|---|
| 2,037,779 | 4/1936 | Granor | 200/61.52 |
| 2,766,346 | 10/1956 | Valdes | 200/61.52 |
| 2,788,420 | 4/1957 | Mathews et al. | 200/279 |

*Primary Examiner*—James R. Scott

[57] ABSTRACT

A tilt actuated circuit breaker that discontinues the flow of electrical energy from a battery through the ignition system of a motor vehicle when the vehicle is involved in an accident. Longitudinal and transverse undulated tubes, each containing a heavy metal ball, define respective paths which permit either one of said balls to contact one of three triggers in the event of an accident to open a switch to break the electric circuit. All three of the triggers are interconnected with a trip arm in a manner whereby actuation of any one trigger by a ball will operate the trip arm to open a latch, permitting movement of a first contact arm of a switch in the circuit out of engagement with a second contact arm. A switch reset tool is built into the device which may be manipulated to re-engage the contact arms to re-establish the circuit.

11 Claims, 7 Drawing Figures

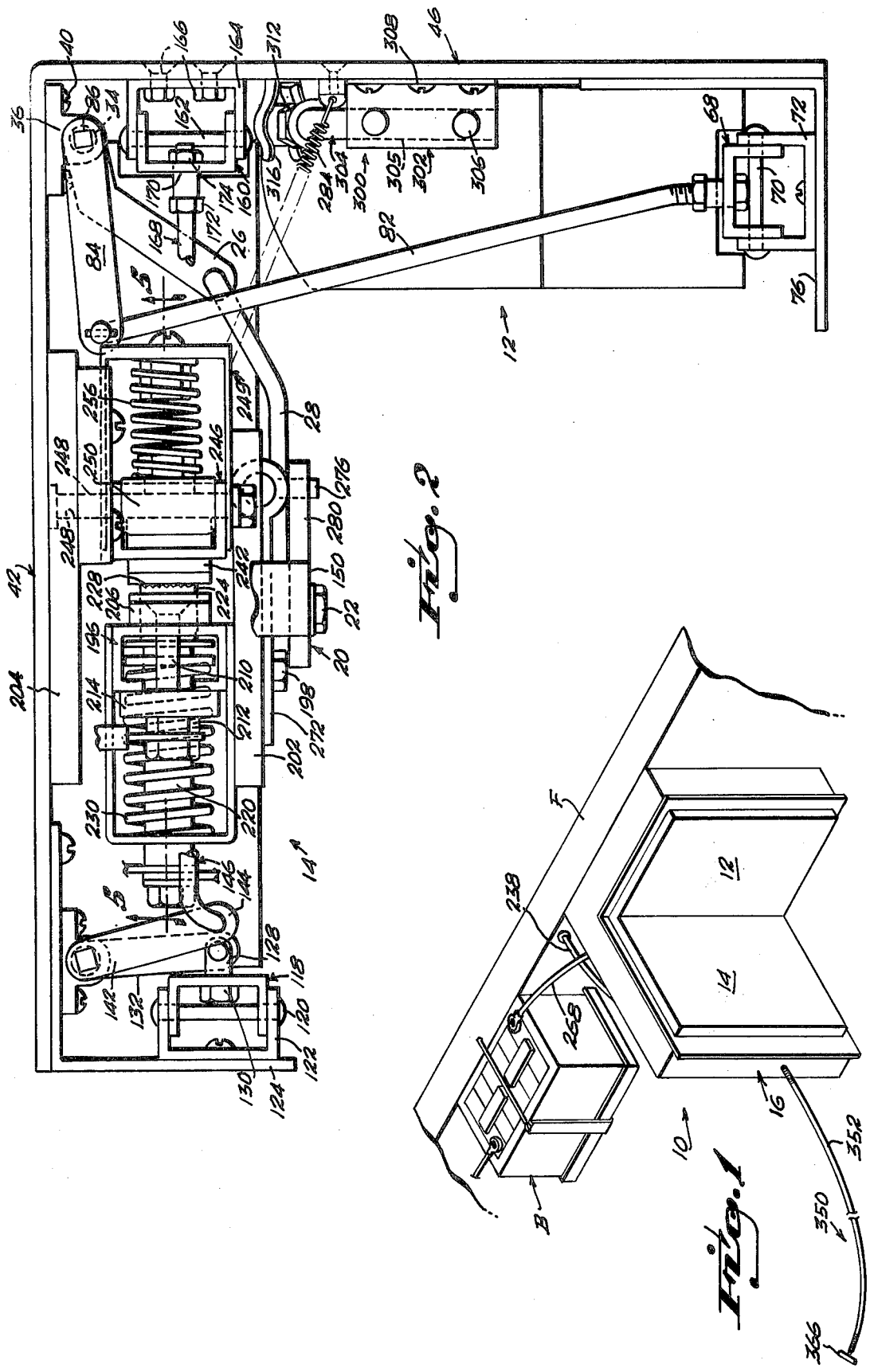

TILT ACTUATED CIRCUIT BREAKER

BACKGROUND OF THE PRESENT INVENTION

Many automotive vehicles catch afire when involved in accidents due primarily to the rupturing of the gas tanks or gas lines on the vehicles while the ignition systems are "on." The present invention pertains to a device which automatically breaks the ignition circuit when an automotive vehicle, for example, is tilted forwardly or to either side to a predetermined degree, is struck forcefully by another vehicle or forcefully strikes a solid object.

Therefore, one of the principal objects of the present invention is to provide a tilt actuated circuit breaker means which automatically "breaks" the ignition circuit of an automotive vehicle when said vehicle is involved in an accident.

Another principal object of the invention is to provide circuit breaker means for an automotive vehicle which automatically "breaks" the ignition circuit when the vehicle attains a predetetmined degree of forward or sideward tilt.

A further object of the instant invention is to provide circuit breaker means of the aforementioned type which automatically "breaks" the ignition circuit when the vehicle is impacted by another vehicle or an impact with a solid object providing a substantial degree of resistance.

Yet another object of the present invention is to provide a self-contained tool, operable to reset the circuit breaker to a contact reset condition.

BRIEF DESCRIPTION OF THE DRAWINGS

FIG. 1 is a fragmentary perspective view of the side frame of an automotive vehicle, illustrating the vehicle's battery mounted thereon and the tilt actuated circuit breaker of the present invention mounted on the frame adjacent the battery;

FIG. 2 is a top plan view of the circuit breaker of FIG. 1 with the cover housing thereof removed;

FIG. 3 is a front end plan view of FIG. 1;

DETAILED DESCRIPTION OF THE DRAWINGS

Figure 5:
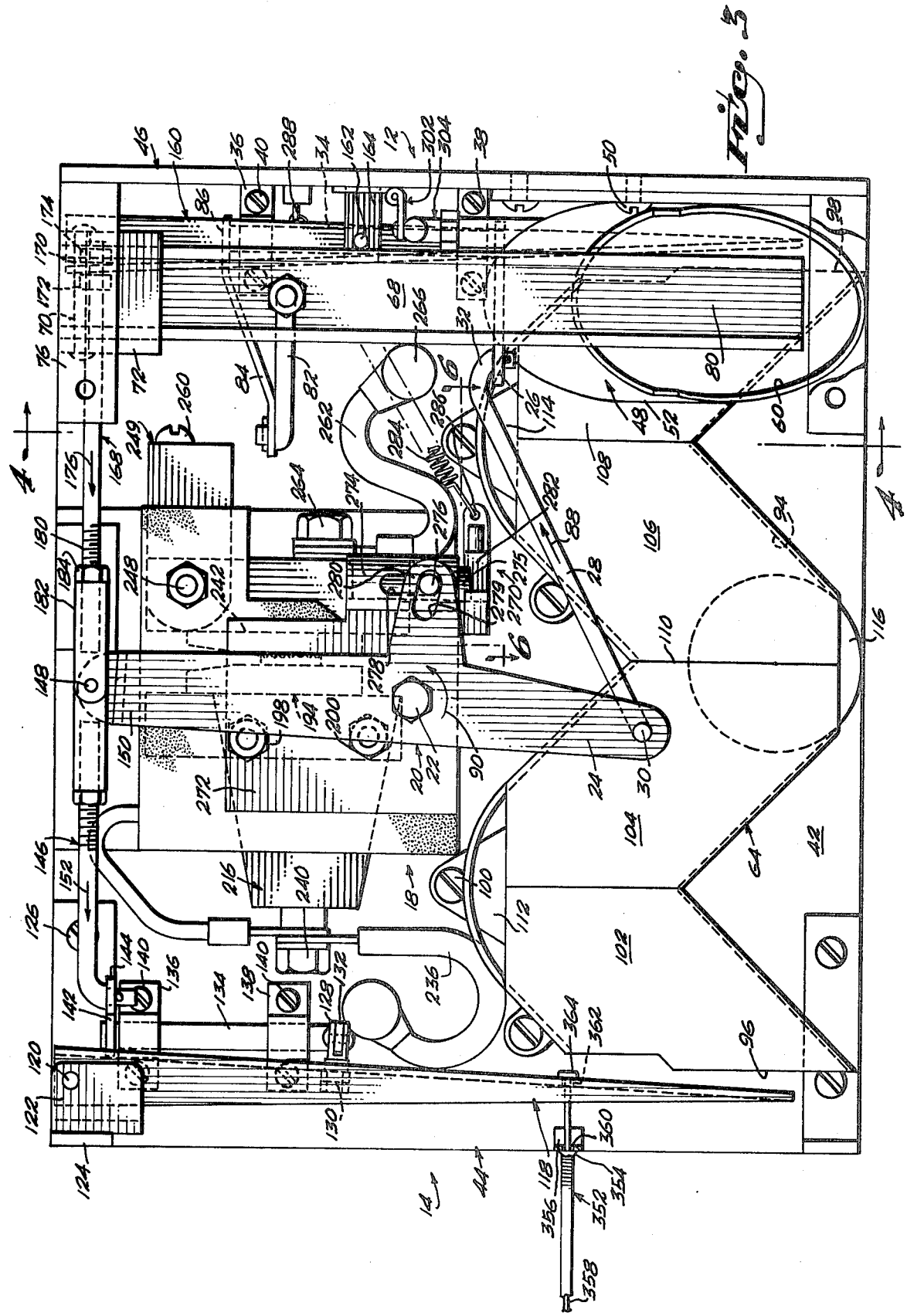
FIG. 5 is a fragmentary vertical sectional view taken along line 5—5 of FIG. 2.

With reference to the drawings in which like reference characters designate like or corresponding parts throughout the various views, and with particular reference to FIG. 1, the tilt actuated circuit breaker of the present invention is designated generally at 10 mounted to a frame member F of an automotive vehicle adjacent the battery B thereof. The circuit breaker is generally L-shaped in plan including a first portion 12 extending generally longitudinally of the vehicle and a transverse portion indicated generally at 14. An L-shaped housing 16, providing a cover for the switching mechanism, is mounted to frame member F in any conventional manner.

Figure 4:
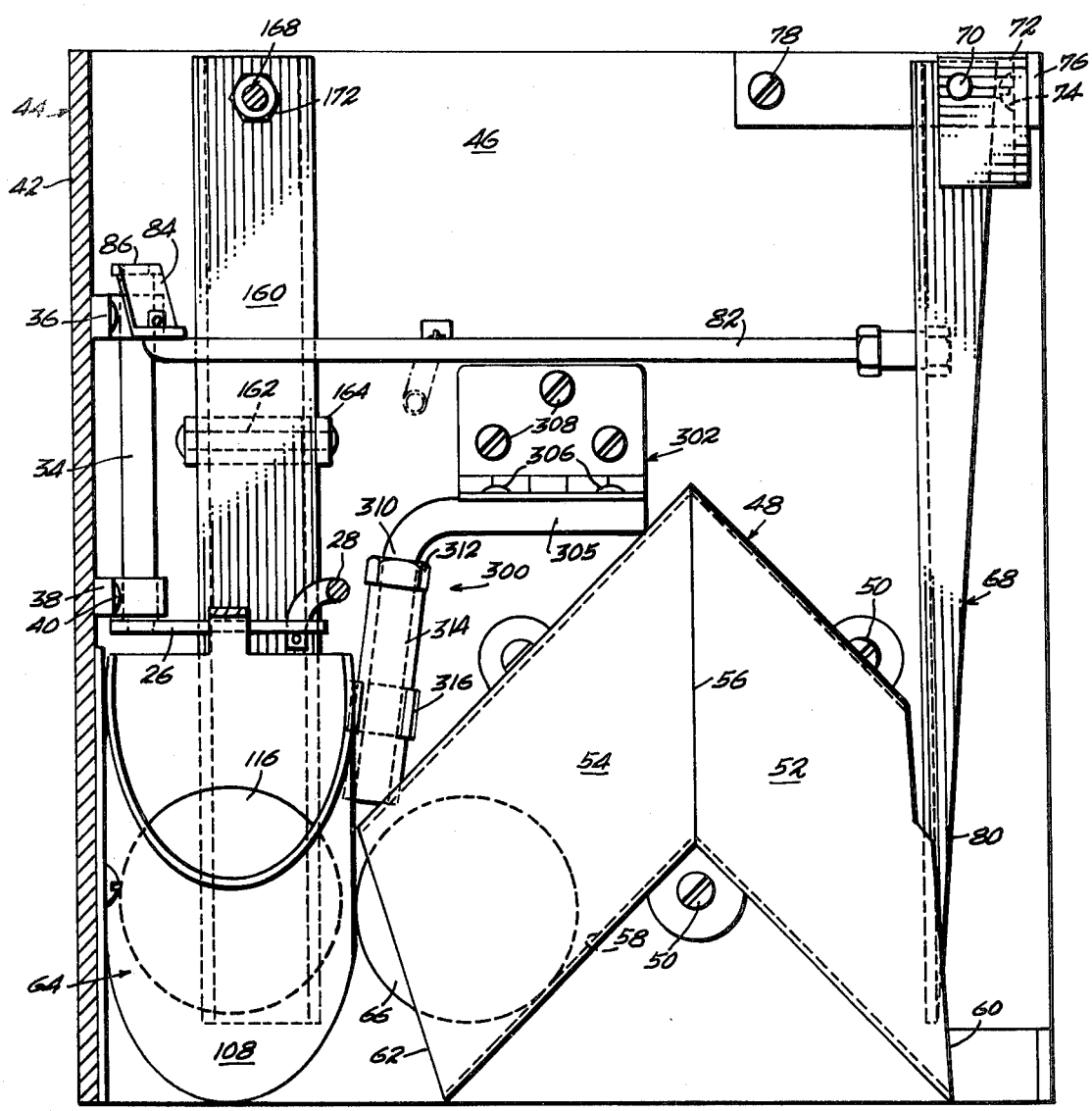
FIG. 4 is a vertical transverse sectional view taken along line 4—4 of FIG. 3.
Figure 5:
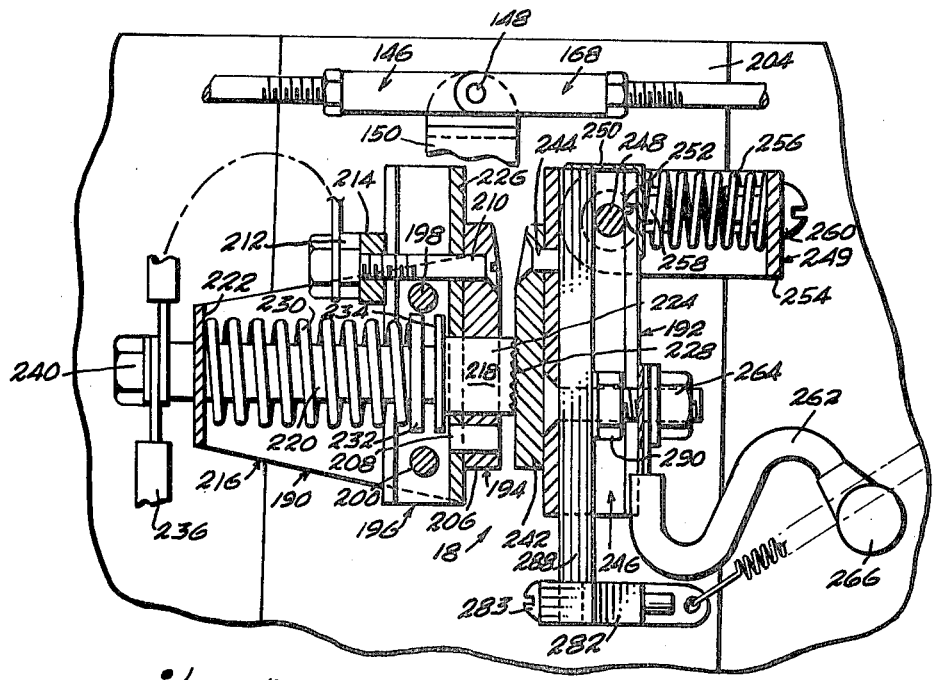

FIGS. 3 and 4 illustrate in vertical elevation, with the cover housing 16 removed, the respective transverse and longitudinal portions 14 and 12. The switch assembly, indicated generally at 18, is operated between "on-off" positions by a main trip arm 20 pivoted at 22 to switch assembly 18. A downwardly extending arm portion 24 of trip arm 20 is connected to a lever arm 26 by a rod 28, pivotally connected at a first end 30 to trip arm portion 20 and at a second end 32 to said lever 26; lever 26 being fixed to a vertical shaft 34 which is journaled in upper and lower journal blocks 36 and 38 fixed by attachment means 40 to a transversely extending portion 42 of a main mounting L-plate 44 which also provides a longitudinal portion 46.

With particular reference to FIG. 4 a first, generally longitudinally extending undulated tube 48 is fixed by attachment means 50 to the longitudinal mounting plate portion 46 and includes forward and rearward tube portions 52, 54 which are oppositely inclined in a manner so as to form an abutted relation 56 at the respective high ends of tubes 52, 54 An undulated tubular path 58 is therefore defined through tube 48 with a high center portion at 56 and normally open low front and rear ends 60, 62. A second undulated tube 64, to be subsequently described, crosses the open rear end 62 of tube 48 to prevent the escape of a heavy steel ball 66 in tubular path 58 from the rear opening 62 of tubular path 58.

A downwardly depending first trigger 68 is pivoted at 70 to a U-bracket 72, fixed as at 74 to an angle member 76 which is in turn fixed at 78 to the upper forward edge of mounting plate portion 46. The lower end 80 of trigger 68 blocks the forward open end 60 of tubular path 58. When the steel ball 60, normally positioned as in FIG. 4, is caused to pass over the center high 56, it engages the lower end 80 of trigger 68 causing it to rock outwardly on pivot pin 70. A link rod 82 pivotally connecting between trigger 68 and a lever 84, fixed at 86 to vertical shaft 34, transmits the movement of trigger 68 to trip arm 20 by means of vertical shaft 34, lever arm 26 and link rod 28 as indicated by arrows 88 and 90, FIG. 3. This causes the switch assembly 18 to be actuated from a normally "on" to an "off" condition in a manner to be subsequently described.

The second undulated tube 64 defines a generally transversely directed undulated path 94 having opposed open low ends at 96, 98; tube 64 being fixed by attachment means 100 to transverse mounting plate portion 42. As best illustrated in FIG. 3, tube 64 is comprised of two pairs of undulated tubular portions 102, 104 and 106, 108, each pair being similar to undulated tube 48 and being abutted at 110. Therefore, undulated path 94, in addition to its open low ends 96, 98, provides a central low at 110 and a pair of highs 112, 114 intermediate said central low 100 and the respective open ends 96, 98.

A steel ball 116 is normally disposed in the central low path position 110 of FIG. 3. When ball 116 is caused to move to the open left end as in FIG. 3 as by an accident or excessive tilting of a vehicle to a first side, a second trigger 118 is actuated about a pivot pin 120 in a top U-bracket 122 fixed to an angle bracket 124 which is, in turn, fixed at 126 to the top left end of the transverse mounting plate portion 42. A yoke member 128, fixed at 130 to trigger 118, is pivotally connected to the first end of a lever 132 which is fixed at a second end to a vertical shaft 134 journaled in upper and lower bearing blocks 136, 138, fixed at 140 to plate portion 42.

A lever 142 fixed to the top end of vertical shaft 134 is pivotally connected at its extended end 144 to an adjustable link 146 which is pivotally connected at 148 to an upwardly extending arm portion 150 of trip arm 20. Actuation of trigger 118 by ball 116 causes link and trip arm 146 and 20 to be actuated in the direction of respective arrows 152 and 90 to actuate switch assembly 18 from a normally "on" to an "off" condition as will be hereinafter described.

When steel ball 116 is caused to move to the open right end 98, a third trigger 160 is actuated to pivot about pin 162 in a central portion thereof. Pin 162 is carried in a U-bracket 164 fixed at 116, FIG. 2, to mounting plate portion 46. A second adjustable link 168 is pivoted at its inner end on common pivot 148 to arm portion 150 of trip arm 20. At its outer end, link 168 passes through the upper end of trigger 160 as at 170 and is confined for movement with said upper end by nuts 172, 174, disposed respectively on opposite sides of the trigger 160. Operation of trigger 160 by ball 116 causes movement of link 168 and trip arm 20 in the directions indicated by arrows 176 and 90 to actuate the switch assembly 18 from its normally "on" to an "off" condition. Therefore, actuation of any one of the three triggers 68, 118 or 160 as above described turns trip arm 20 in the same direction, indicated by arrow 90, to actuate switch assembly 18 to its "off" position.

Both adjustable links 146 and 168 include a threaded rod portion 180 for engagement in an elongated nut 182 and a lock nut 184. In this manner the lengths of links 146, 148 may be properly coordinated for operation of the trip arm 20.

Referring to FIG. 5, the switch assembly 18 is comprised of first and second contact assemblies 190 and 192. First contact assembly 190 is comprised of first contact means 194 mounted to a generally vertically extending channel 196, bolted at 198, 200 between a front insulation plate 202 and a back insulation plate 204 fixed by conventional attachment means such as screws, rivets, etc., now shown, to the mounting plate portion 42. A fixed contact portion 206 of first contact means 194 is fixed to channel 196 by a lower pin 208 and an upper bolt and nut assembly 210, 212, said bolt extending through contact portion 206, channel 196 and a strap 214 spanning the open side of channel 196. Referring to FIGS. 2 and 5, a U-shaped bracket 216 is also fixed to channel 196 by bolts 198, 200 and a movable contact portion 218 of first contact 194 includes an elongated shank portion 220 extending outwardly for slidable engagement through a back web 222 of U-bracket 216. A head portion 224 of contact portion 218 is slidably engaged through web 226 of channel 196 and fixed contact portion 206. The contact surface of head 224 is provided with a plurality of sharp teeth 228. A heavy compression spring 230 is circumposed about shank portion 220 between back web 222 and a flange 232 from shank portion 220 to strongly urge the toothed contact surface 228 outwardly beyond the fixed contact portion 206. A second flange 234 on shank 220 limits the outward movement. As illustrated in FIGS. 3 and 4, an electric lead 236 from the ground connection 238 in FIG. 1 is bolted to both contact portions 206 and 218 as at 240 and 212.

With further reference to FIG. 5, a second contact 242 is fixed as at 244 to a generally vertically disposed channel 246 which is pivotally connected at 248 between the front and back insulation plates 202, 204. A U-bracket 249 is pivotally engaged at its open end on pivot 248 in a spanning relation to the top end of channel 246 and an angle member 250 is disposed across the top of channel 246 with one web 252 thereof extending downwardly in a spanning relation across the vertical open upper portion of said channel 246. Extending between web 252 and the closed end 254 of U-bracket is a strong compression spring 256 which is retained in place by nut and bolt means 258, 260 carried respectively by web 252 and closed end 254. In this manner the second contact 242 is yieldably pivotally retained by spring 256 on pivot 248. A second electric lead 262 is connected between the second contact assembly 192 by nut and bolt means 164 and terminal 266 with a lead 268 extending therefrom to the negative battery terminal as illustrated in FIG. 1.

Figure 6:
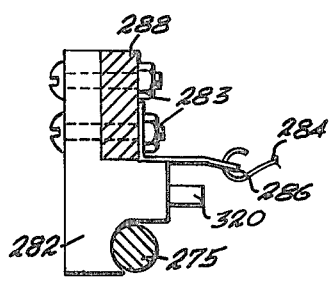
FIG. 6 is a horizontal sectional view taken along line 6—6 of FIG. 3.

Latch means 270 are provided to maintain the contact assemblies 190, 192 in the engaged or "on" positions illustrated in the drawings. To this end a plate 272 is fixed over front insulation plate 202 by bolts 198, 200. A tubular side portion 274 from plate 272 is slidably traversed by a latch bolt 275 having an ouwardly extending operating pin 276 extending through and beyond a slot 278 in bolt tube 274 for engagement through a slot 279 disposed in an arm portion 280 of trip arm 20 in a manner so as to move the latch bolt out of engagement with a keeper 282 to permit the contact assembly 192 to be pivoted counterclockwisely out of engagement with contact assembly 190 under the influence of a tension spring 284 connecting between keeper 282 as at 286 and mounting plate portion 46 as at 288. Keeper 282 is bolted at 283, FIG. 6, to the lower end of a stem 288 extending upwardly through channel 246 and being bolted in place as at 290.

As previously described, actuation of any one of triggers 68, 118 or 160 will rotate the trip arm 20 counterclockwisely. This results in the aforedescribed unlatching operation to break the electrical circuit.

Figure 7:
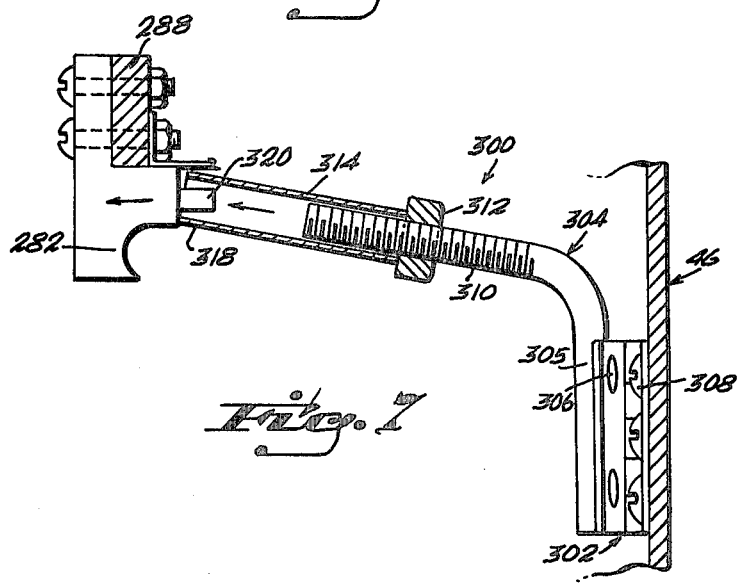
FIG. 7 is a fragmentary view of a self-contained tool, illustrated partially in cross section, in an operable position to reset the circuit breaker contact arms to a circuit "on" position.

A self-contained tool 300 is hinged at 302 to mounting plate portion 46 as best illustrated in FIGS. 4 and 7. The tool is comprised of an L-shaped rod 304, one leg 305 of which is fixed by rivets 306 to the hinge 302 which is in turn fixed to plate portion 46 by screws 308. The second leg 310 of rod 304 is screw-threaded for reception of a nut 312 which engages a tube 314 disposed over leg 310. As seen in FIG. 4, when not in use, the tool 300 is retained in place against plate portion 46 by a spring clip 316, fixed to plate portion 46. When it becomes necessary to re-engage the contact assemblies 190, 192, the tool is swung outwardly as in FIG. 7, whereupon the extended end 318 of tube 314 is positioned to engage over a positioning pin 320 fixed to bolt keeper 282. Proper manipulation of nut 312 causes the tube 314 to move outwardly to pivot contact assembly 192, first, into engagement with contact assembly 190 and, second, to depress contact portion 218 against the substantial forces of compression spring 230 until the latch means 270 are re-engaged. Second contact 242 is preferably formed of a relatively soft electrical conductive material such as lead to permit the toothed contact surface 228 of first contact 194 to bite thereinto to form an ideal electrical contact.

With reference to FIGS. 1 and 3, a remote control means, indicated generally at 350, enables an occupant within a vehicle to break the circuit in an emergency. A sheath 352 is fixed as by welding 354 to a bracket 356, fixed in any convenient manner to the main mounting plate 44. A cable 358 slidably engaged through sheath 352 includes an extended end portion slidably enaged through enlarged holes 360, 362 in bracket 356 and any one of the triggers such as 118. An enlarged head 364 fixed to the end of the cable on the inside of trigger 118 serves to rock the trigger 118 when the knob 366 carried on the opposite end of the cable 358 is properly actuated. The electric circuit will therefore be broken in the same manner as above described relative to contact of ball 116 with trigger 118. The knob end of the cable will be located within the vehicle, preferably in the glove compartment.

What is claimed is:

1. A tilt actuated circuit breaker comprising:
 a first contact assembly including a fixed mounting means,
 a first contact portion fixed to said fixed mounting means,
 a second contact portion including means for slidable mounting engagement with said first contact portion and a contact surface normally extending outward a predetermined distance beyond first contact portion, and a compression spring means engaged between said fixed mounting means and said second contact portion, normally urging said second contact portion with said contact surface a predetermined distance beyond said first contact portion,
 a second contact assembly including a pivotal mounting means and a unitary contact fixed to said pivotal mounting means,
 a tilt-releasable latch means fixably mounted in position to latch said pivotal mounting means with said unitary contact, normally urging said unitary contact against said contact surface of said second contact portion and moving said second contact portion inwardly a predetermined distance against the forces of said compression spring means,
 electric circuit means comprising electrical conductor means connecting between a battery and said first and said second contact portions, and said unitary contact and a ground connection, and
 latch trip means connected to said latch means to normally maintain said electric circuit through said engaged unitary contact and said second contact portion.

2. The tilt actuated circuit breaker as defined in claim 1 wherein said unitary contact is at least partially formed of a relatively soft electric conductive metal such as lead, and said contact surface is in the form of relatively sharp teeth.

3. The tilt actuated circuit breaker as defined in claim 1 including tilt actuated trigger means connected to said latch trip means to disengage said latch means from said pivotal mounting means moving said unitary contact beyond the reach of said contact surface of said first contact assembly when the angle of the circuit breaker attains a predetermined degree of tilt to the horizontal.

4. The tilt actuated circuit breaker as defined in claim 3 including a tension spring connected to said pivotal mounting means to move said unitary contact fixed to said pivotal mounting means out of engagement with said contact surface when said latch means is disengaged.

5. The tilt actuated circuit breaker as defined in claim 4 including a self-contained tool connected to the tilt actuated circuit breaker, including means to permit pivotal positioning of said tool for engagement with said pivotal mounting means in said out of engagement position and including manual operating means to move same back to said latched engaged position.

6. The tilt actuated circuit breaker as defined in claim 4 including a manually operated remote control means connected to said trigger means to actuate said trigger means, upon proper manipulation of said remote control means, to disengage said latch means from said pivotal mounting means to cause the circuit to be broken.

7. The tilt actuated circuit breaker as defined in claim 3 including a longitudinally extending ball guide and a first ball therein, said ball guide defining an undulating path for said ball with at least one open low end and a high point between the normal position of the ball in said path and said open low end, said trigger means including a first pivoted trigger having a lower end disposed adjacent said open low end for engagement by the first ball when said first ball is caused to pass from its normal position over the high point, said first trigger having an upper end including first connecting means to said latch trip means to disengage said latch upon contact of said first ball with said first trigger lower end.

8. The tilt actuated circuit breaker as defined in claim 7 including a transversely extending ball guide and a second ball therein, said transverse ball guide defining an undulating path for said second ball with open first and second low ends and a low center, and a high point intermediate each of said low ends and said low center, said second ball normally being positioned in said low center; said trigger means including second and third pivoted triggers having lower ends disposed adjacent the respective first and second open low ends in positions whereby either one of same may be engaged by the second ball when said second ball is caused to pass from its normal position in said low center over one of said intermediate high points, said second and third triggers having upper ends with respective second and third connecting means to said latch trip means to cause disengagement of said latch upon contact of said second ball with said second or third triggers lower end.

9. The tilt actuated circuit breaker as defined in claim 8 wherein said latch trip means comprises a pivoted lever and including link means pivotally connecting between each of said first, second and third triggers and said pivoted lever comprising said first, second and third connecting means.

10. The tilt actuated circuit breaker as defined in claim 9 wherein said latch means comprises a fixed bolt assembly and a keeper, said bolt assembly including a sliding bolt operable between engaged and disengaged positions relative to said keeper which is fixed to said pivotal mounting means.

11. The tilt actuated circuit breaker as defined in claim 10 incuding an outwardly extending pin from said bolt and an elongated slot in said latch trip means for through engagement by said pin.

* * * * *